G. A. LYON

Oct. 11, 1932. COVER FOR SPARE AUTOMOBILE TIRES Re. 18,619

Original Filed Dec. 14, 1928

INVENTOR
GEORGE ALBERT LYON
BY Merrill & Spencer
ATTORNEYS

Reissued Oct. 11, 1932 Re. 18,619

UNITED STATES PATENT OFFICE

GEORGE ALBERT LYON, OF ALLENHURST, NEW JERSEY, ASSIGNOR TO LYON, INCORPORATED, OF ASBURY PARK, NEW JERSEY, A CORPORATION OF DELAWARE

COVER FOR SPARE AUTOMOBILE TIRES

Original No. 1,846,266, dated February 23, 1932, Serial No. 325,993, filed December 14, 1928. Application for reissue filed August 16, 1932. Serial No. 629,085.

This invention relates to covers for spare tires carried upon automobiles.

The usual spare tire cover consists of a canvas casing coated with waterproofing material and formed to fit the contour of the tire. These tire covers are unattractive in oppearance and are difficult to apply to a tire, particularly after the material has shrunk because of its exposure to the weather. These covers often cannot be applied to a tire so that they will fit the tire smoothly, and the wrinkles in the material, especially on the outer exposed side of the tire, give the cover a very unattractive appearance. Such covers also do not constitute a satisfactory protection for the outer surface of the tire against damage in case of collision.

The principal objects of the present invention are to improve the construction and mode of operation of spare tire covers and to produce a cover which will present a highly attractive appearance, which will furnish a satisfactory protection for the tire and which may be readily applied to and removed from the tire.

With these and other objects in view, the invention comprises the novel and improved features, constructions and combinations of parts hereinafter described and particularly pointed out in the claims, the advantages of which will be readily understood and appreciated by those skilled in the art.

The invention will be clearly understood from the accompanying drawing illustrating the invention in its preferred form and the following detailed description of the constructions therein shown.

In the drawing—

Figure 1:
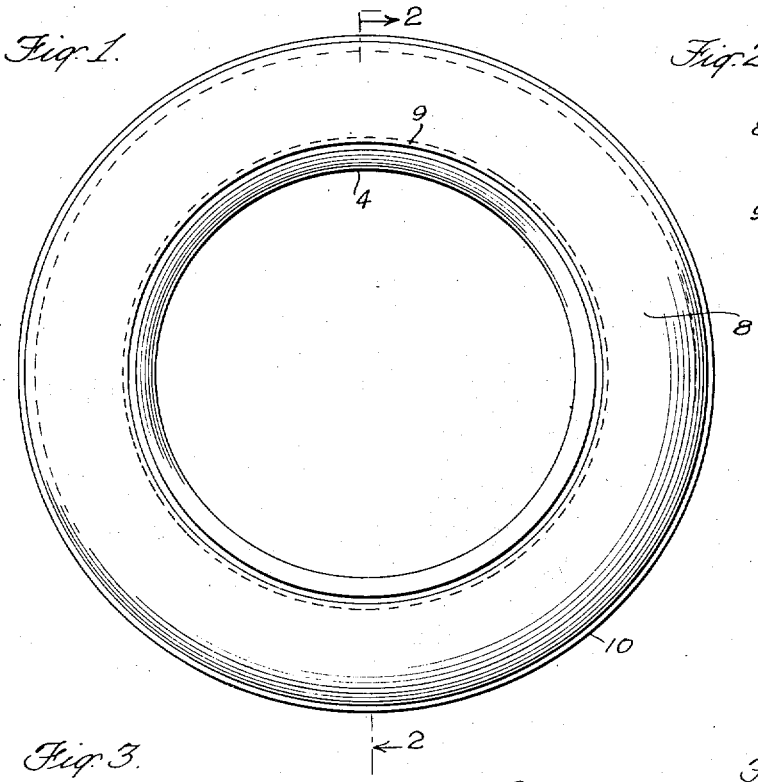
Fig. 1 is a view in front elevation of a spare tire with a tire cover embodying the invention applied thereto.

The tire cover embodying the invention is shown in the drawing of this application as applied to a tire 2 mounted on a rim 4.

The tire cover preferably consists of a continuous ring of sheet material arranged to cover the outer side of the tire and the periphery thereof.

Figure 2:
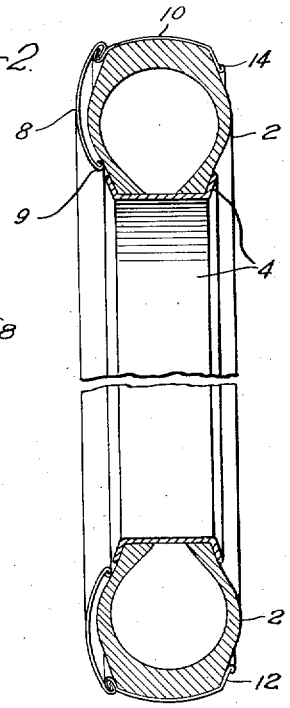
Fig. 2 is a sectional view taken substantially on the line 2—2 of Fig. 1.
Figure 3:
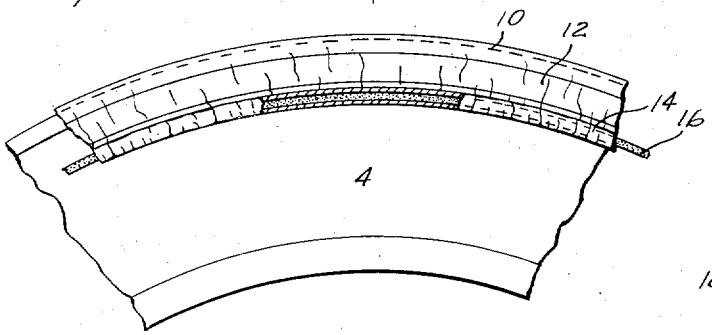
Fig. 3 is a fragmentary view in elevation of a tire and tire cover taken from the rear or inner side of the tire with a portion of the cover shown in section.
Figure 5:
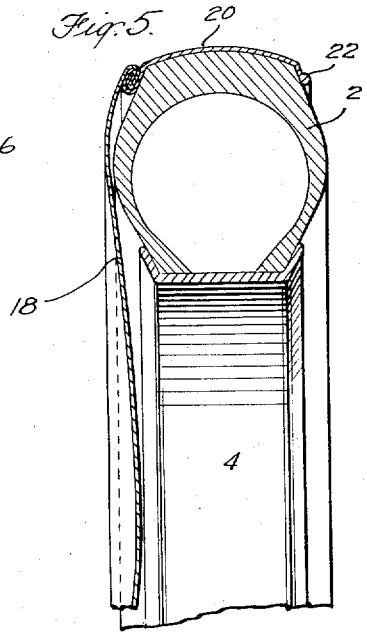
Fig. 5 is a view similar to Fig. 4 illustrating a modified form of the invention.
Figure 4:
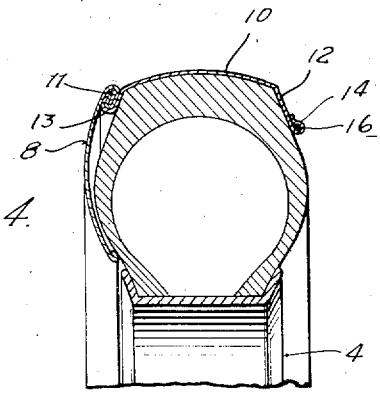
Fig. 4 is a detail sectional view taken substantially on the line 4—4 of Fig. 1 and on an enlarged scale.

In the form of the invention shown in Figs. 1 to 4 inclusive, the tire cover comprises a continuous ring section 8 arranged to cover the outer side of the tire and a continuous ring section 10 extending about the peripheral portion of the tire. The section 8 of the cover is preferably made of relatively stiff material such as sheet metal and as shown in these figures is made in the form of a ring arranged to extend from the periphery of the tire to or adjacent to the inner margin of the tire. This section of the cover may, however, be made in the form of a plate extending from the periphery of the tire to the axis thereof. The inner margin of the section 8 is provided with a bend or curl indicated at 9 to provide this margin with a finished rounded edge and the outer margin or part of section 8 is curved inwardly adjacent the tread (Figures 2, 4 and 5).

The section 10 of the tire cover is preferably made of flexible sheet material such as waterproofed fabric and is preferably secured to the outer margin of the section 8. As shown in Figs. 2 and 4 the outer margin of the section 8 is rolled or folded as indicated at 11, and the forward or outer lateral margin 13 of the section 10 is secured within the folds of the section 8, the metal of section 8 being pressed tightly against the section 10 to hold the same securely. The metal of the section 8 is turned inwardly to form this folded portion so that the section 8 is located on the outside of the section 10 at the joint between said sections. Thus, there is no joint or break in the outer side of the cover from the inner margin to the periphery thereof, the section 8 presenting a smooth surface between these points.

The section 10 extends from the margin of the section 8 laterally over the periphery of the tire and its width is preferably such that its inner marginal portion indicated at 12, may be drawn down over the inner face of the tire to secure the tire cover in place. As shown clearly in Fig. 4 the inner lateral margin of the section 10 is turned back upon the body of said section to form a looped portion indicated at 14, and a cord 16 is passed through this looped portion of the cover. This cord may be made of elastic material such as rubber, with its length considerably less than the circumference of the tire. The cord may, if desired, however, be made of relatively inelastic material such as fiber or other ordinary cord material. In this event, the cord is provided with end portions extending through an opening in the looped portion 14 of the cover which may be grasped by the operator to draw the inner marginal portion of the section 10 inwardly over the inner face of the tire.

In applying the tire cover above described to a tire, the inner margin 12 of the section 10 is expanded so that it will pass over the tire and the tire cover is then drawn over the tire with the section 10 surrounding the periphery thereof until the movement of the cover is limited by the engagement of the section 8, or the outer margin of the section 10 at the joint between the two sections, with the tire. The section 10 is preferably so constructed that it will fit the peripheral portion of the tire without wrinkling. When a cord 16 of elastic material is inserted in the looped portion 14 of the section 10, after the cover is drawn over the tire the inner margin is released and the cord then acts to contract the same, drawing said margin down over the inner face of the tire, as shown in Fig. 4. When an ordinary cord is employed the end portions of the cord are drawn together to contract the inner margin of the section 10 and the ends of the cord are then tied securely together.

The relatively stiff section 8 of the tire cover covering the outer face of the tire gives a highly attractive appearance to the cover when the cover is applied to a tire and forms an efficient protection to prevent damage to the tire in case of collision. The section 10 of the tire cover protects the peripheral portion of the tire and the drawing of the inner margin of this section down over the inner face of the tire holds the tire cover securely in place on the tire.

In the construction shown in Fig. 5 the tire cover comprises a section 18 arranged to cover the outer face of the tire and a section 20 extending about the peripheral portion of the tire. The section 18 in this form of the invention also is made of relatively stiff material such as sheet metal and extends from the axis of the tire to the periphery thereof, as shown clearly in Fig. 5. The section 20 of the tire cover in this form of the invention consists of a section of highly flexible and elastic sheet material such as sheet rubber. The outer margin of the section 18 of the cover is provided with folds within which the outer lateral margin of the section 20 is gripped to secure the two sections together, as in the construction shown in Figs. 2 and 4.

The section 20 of the cover preferably is made somewhat smaller than the periphery of the tire, so that a certain amount of stretching of this section is required in applying the tire cover to a tire. The inner lateral margin of the section 20 also is provided with an enlargement or bead 22 at the edge of this section which reinforces the section and increases the contracting force exerted by the section when the section is stretched outwardly.

In applying the construction shown in Fig. 5, to a tire, the section 20 is expanded and drawn over the tire until the movement of its outer margin is limited by the engagement of the section 18 with the tire. The section 20 is then released, allowing the same to be contracted upon the tire by the elasticity of the rubber. This manner of applying the tire cover will locate the section 18 in substantially the position shown in Fig. 5. Upon the release of the section 20 the elasticity of the rubber will draw the inner margin of said section down over the inner face of the tire, as clearly shown in Figure 5. This will hold both sections of the cover securely in place on the tire.

With either of the constructions shown in the drawing the relatively stiff section of the cover covering the lateral face of the tire presents a very attractive appearance and efficiently protects the tire against damage in case of collision. The section of the flexible material surrounding the periphery of the tire and extending down over the inner face of the tire will securely hold the cover in position. This flexible section forms an efficient protection for the peripheral portion of the tire. These tire covers also have the advantage that they may be very readily applied to and removed from the tire. The outer relatively stiff section 8 holds the flexible section 10 in position to facilitate applying the cover to the tire and also prevents the flexible section from collapsing and becoming cracked when the cover is removed from the tire.

It is to be understood that the invention is not limited to the particular construction and arrangement of parts of the illustrated embodiment of the invention, but that the invention may be embodied in other forms within the scope of the claims.

Having explained the nature and object of the invention and having specifically described a construction embodying the invention in its preferred form, what is claimed is:

1. A spare tire cover designed to be flexed into tire protecting position including a metallic side plate for protecting and abutting against the side of the tire and arcuate rim-like means of flexible material associated with said side plate so as to prevent collapsing of said rim-like means and formed to be stretched over the outer periphery of the tire to cover the same, said means being so shaped and proportioned that when in tire protecting position a portion of said means will be spaced inwardly from the outer periphery of the tire such a distance as to hold the cover in position and yet permit of the moving of the tire cover into said position, said side plate having a circumferentially extending inwardly curved convex portion adjacent the tread.

2. A spare tire cover designed to be manually moved into tire protecting position including a metallic side plate for disposition over a side of the tire and arcuate-like rim means of flexible material associated therewith to cover the outer periphery of the tire and including a manually collapsible portion so shaped and proportioned that when in tire protecting position an edge thereof will be spaced inwardly from the outer periphery of the tire such a distance as to hold the cover in position and yet permit of the flexing of said portion over the rear edge of the tread, said side plate having an inwardly curved circumferentially extending convex portion adjacent the tread.

3. A spare tire cover designed to be manually moved into tire protecting position including a metallic annular side portion for disposition over an outer side wall of the tire and arcuate-like rim means associated therewith to cover the outer periphery of the tire and including a manually collapsible portion of flexible material cooperable with said side portion to draw it against said outer side wall of the tire and so shaped and proportioned that when in tire protecting position an edge thereof will be spaced inwardly from the outer periphery of the tire such a distance as to hold the cover in position and yet permit of the flexing of said collapsible portion over the rear edge of the tire tread.

4. A spare tire cover designed to be manually moved into tire protecting position including a stiff annular side portion for disposition over an outer side wall of the tire and arcuate-like rim means associated therewith to cover the outer periphery of the tire and including a manually collapsible portion of flexible material cooperable with said side portion to draw it against said outer side wall of the tire and so shaped and proportioned that when in tire protecting position an edge thereof will be spaced inwardly from the outer periphery of the tire such a distance as to hold the cover in position and yet permit of the flexing of said collapsible portion over the rear edge of the tire tread, said side portion having an inwardly curved circumferentially extending part adjacent the tread.

In testimony whereof, I have hereunto subscribed my name at Washington, D. C.

GEORGE ALBERT LYON.